May 13, 1952

G. LUFKIN 2,596,339

APPARATUS FOR LOADING AND UNLOADING
JARS INTO AND OUT OF CONTAINERS

Filed April 6, 1946

Inventor
GARLAND LUFKIN

By Rule and Hoge,
Attorneys

May 13, 1952
G. LUFKIN
2,596,339
APPARATUS FOR LOADING AND UNLOADING
JARS INTO AND OUT OF CONTAINERS
Filed April 6, 1946
4 Sheets-Sheet 2
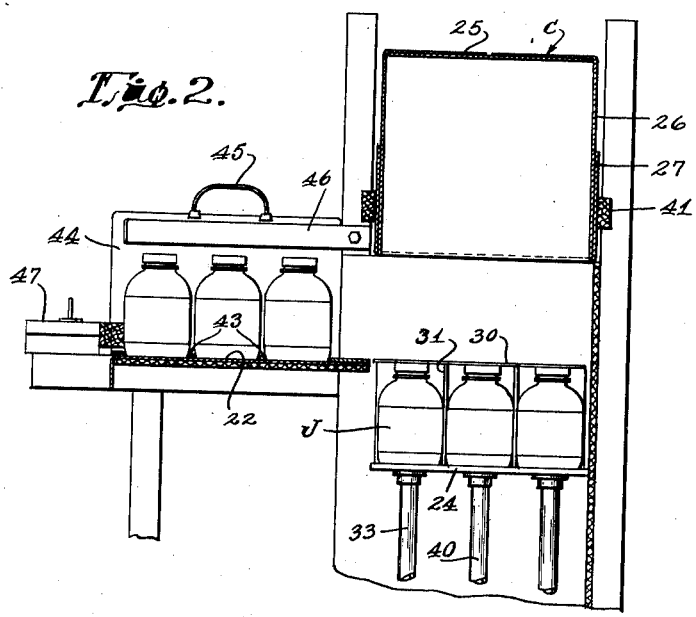
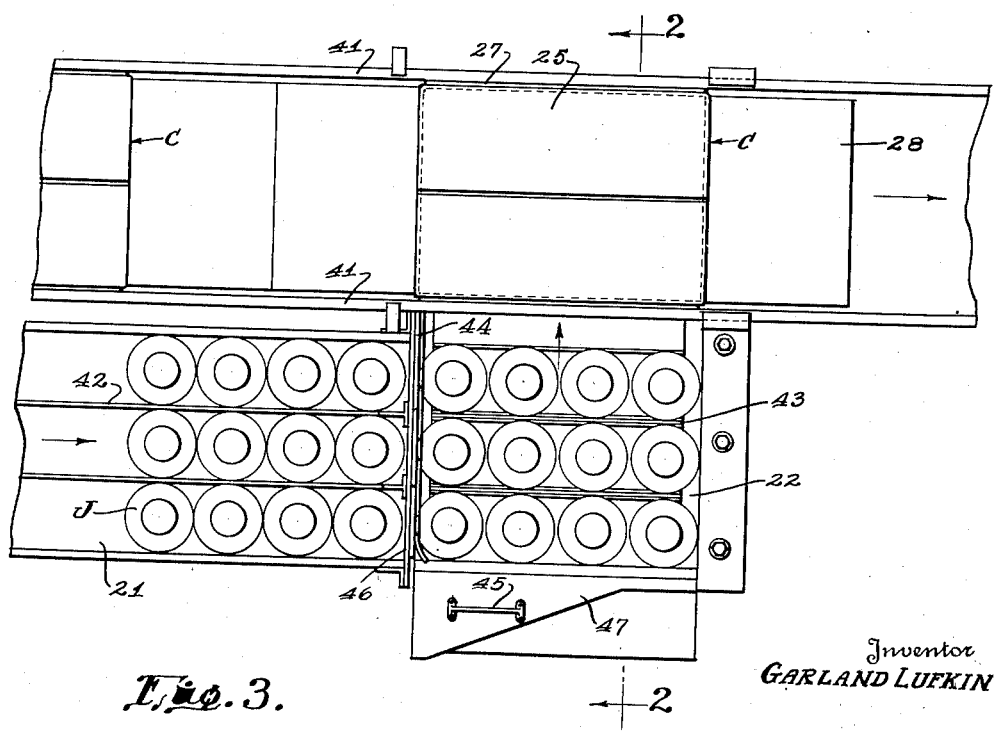
Inventor
GARLAND LUFKIN
By Rule and Hoge
Attorneys May 13, 1952  G. LUFKIN  2,596,339
APPARATUS FOR LOADING AND UNLOADING
JARS INTO AND OUT OF CONTAINERS
Filed April 6, 1946  4 Sheets-Sheet 3
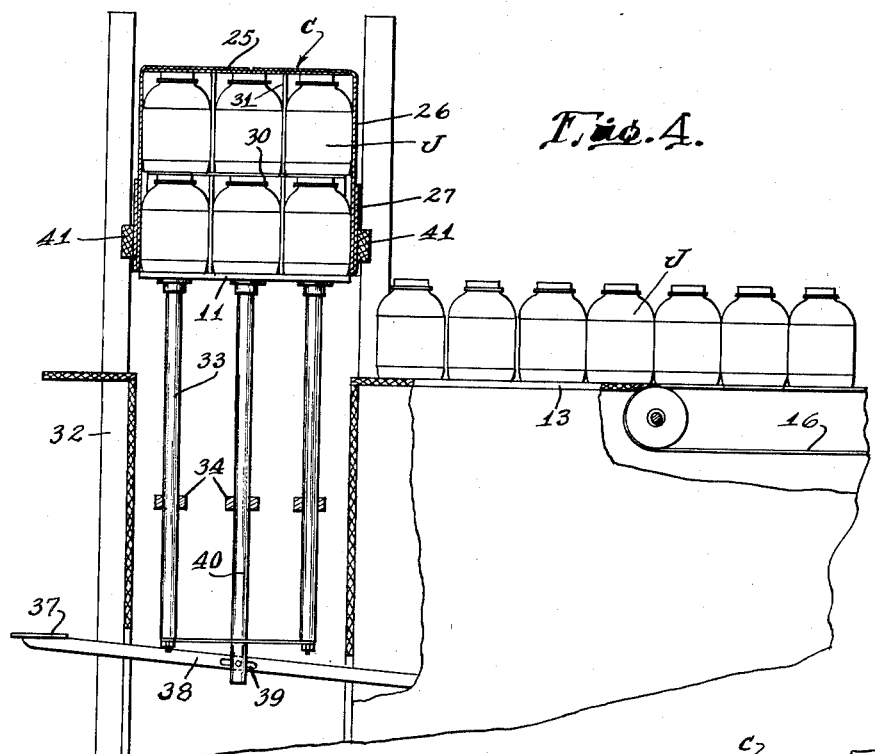
Fig. 4.
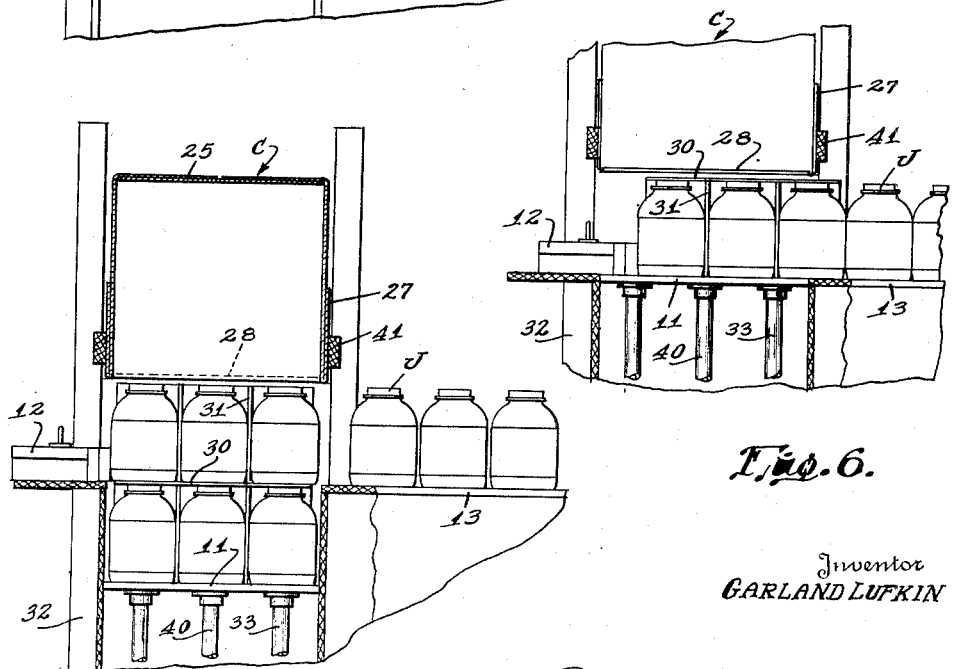
Fig. 5.
Fig. 6.
Inventor
GARLAND LUFKIN
By Rule and Hoge
Attorneys

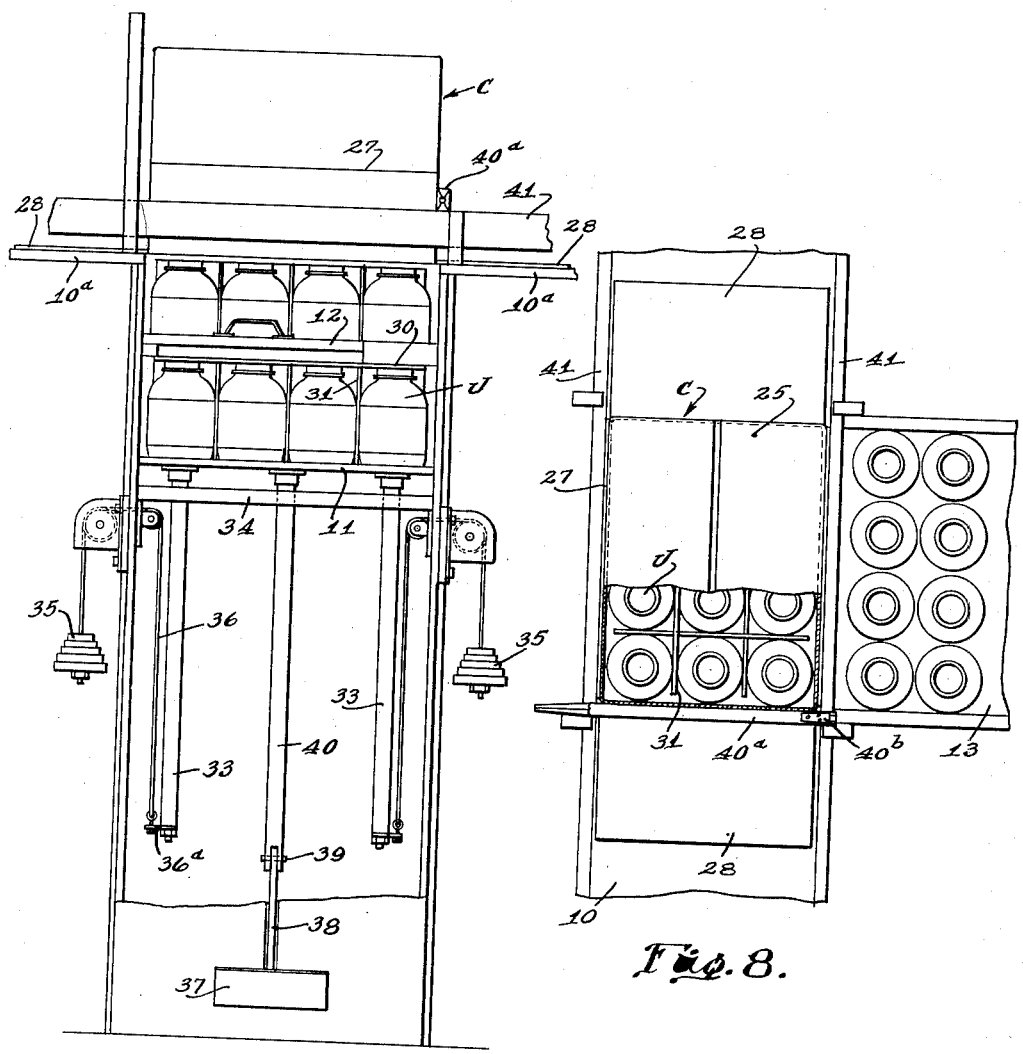

Patented May 13, 1952

2,596,339

UNITED STATES PATENT OFFICE 2,596,339

APPARATUS FOR LOADING AND UNLOADING JARS INTO AND OUT OF CONTAINERS

Garland Lufkin, Toledo, Ohio, assignor to Owens-Illinois Glass Company, a corporation of Ohio Application April 6, 1946, Serial No. 660,041

5 Claims. (Cl. 226—16)

My invention relates to apparatus for use in the packaging of foods or other commodities which are packed in glass jars or containers, the containers being thereafter packed and sealed in cases or cartons.

Empty glass jars or containers are sometimes packed for shipping in cartons and thereafter unloaded from the cartons, filled with the desired commodity, sealed, and repacked in the same cartons or cases. An object of my invention is to provide a new and practical apparatus for uncasing the empty containers and casing the containers which have been filled and sealed, the uncasing, filling, sealing, and casing of the containers being carried on concurrently as a continuous operation.

A further object of the invention is to provide apparatus adapted for uncasing or unpacking empty jars from cases in which they have been packed in tiers and for repacking or casing the jars after they have been filled and sealed.

Other objects of the invention will appear hereinafter.

Referring to the accompanying drawings:

Fig. 2 is a sectional elevation, with parts broken away, showing the casing or loading platform in its lowered position, the section being taken at the line 2—2 on Figs. 1 and 3;

Fig. 3 is a plan view of the apparatus shown in Fig. 2;

Fig. 4 is a part-sectional elevation of the uncasing apparatus, the platform being in its uppermost position;

Fig. 5 is a similar view with the platform in its lowered position;

Fig. 6 is a similar view with the platform at an intermediate position;

Fig. 7 is an elevational view of the uncasing apparatus shown in Fig. 4, looking in a direction perpendicular to that of Fig. 4; and Fig. 8 is a fragmentary plan view of the apparatus shown in Fig. 7, the case being partly broken away and shown in section.

Figure 1:
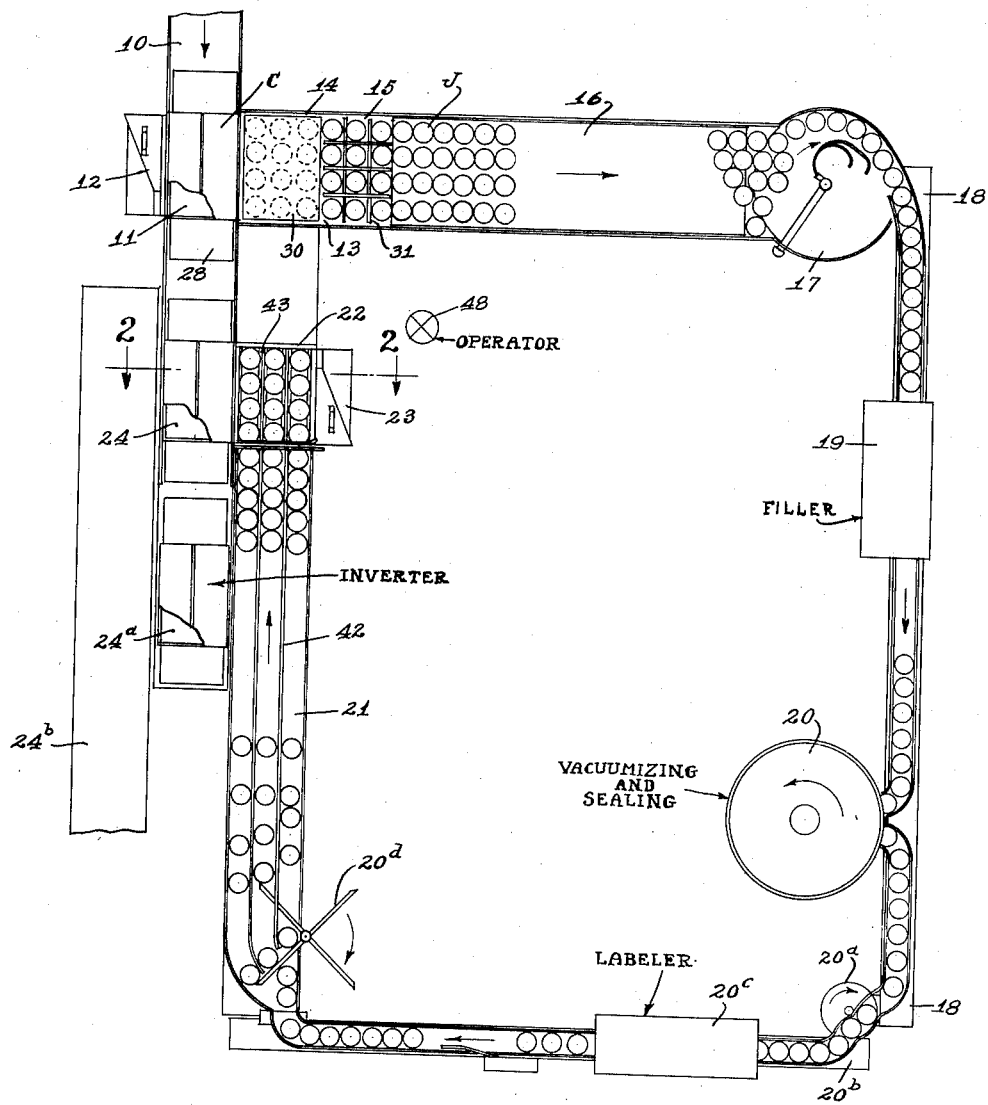
Fig. 1 is a diagrammatic plan view of apparatus for packaging commodities which are packed in jars.

The apparatus as herein illustrated and described is designed for use in the packaging, for example, of coffee packed and sealed in glass jars, but it will be understood that the apparatus may be adapted for the packaging of various other commodities and in other types of containers.

Referring to Fig. 1, the packaging apparatus comprises, in general terms, a bar conveyor 10 by which the cartons or cases C are conveyed to an uncasing platform 11, the cases being in inverted position and filled with empty jars J which are inverted relatively to the cases, a pusher plate 12 by which the jars are pushed off the platform 11 onto a receiving table 13 at stations 14 and 15; a conveyor 16 by which the empty jars are conveyed to a turntable 17 and transferred to a conveyor 18 which conveys the jars through a filling apparatus 19 by which the jars are filled, for example, with ground coffee; a vacuum sealing and cap tightening machine 20 by which the filled jars are vacuumized and sealed; a turntable 20a by which the jars are transferred from the belt conveyor 18 to a traveling belt conveyor 20b; a labeler 20c for applying labels to the jars; a star wheel 20d by which the feed of the jars is controlled and the jars are directed onto a three-lane traveling belt conveyor 21; a casing table 22 to receive the jars from the conveyor 21; a pusher 23 by which the jars are transferred to a casing platform 24 operable for loading the filled jars into the cases C; an inverter 24a by which the loaded cases are inverted and transferred to a conveyor belt 24b which conveys the cases to a gluer (not shown) by which the cases are sealed.

Figs. 4 to 8 illustrate the apparatus for uncasing or removing the empty jars from the cases C. The case, which is shown upside down, comprises a bottom 25, side walls 26, and side and end flaps 27 and 28 respectively. The side flaps 27 are folded back against the sides of the carton and the end flaps 28 turned out to horizontal position so that the inverted case is open to discharge the jars. As shown, the case is of a size to hold 24 jars packed in two tiers of 12 jars each. The two tiers are separated by a horizontal spacing pad 30 of corrugated paper or the like. Partitions 31 or spacing strips are inter-connected to form a unit comprising individual cells for the jars.

The uncasing platform 11 is mounted for up-and-down movement in the stationary framework or well 32 and is supported on vertical guide rods 33 secured to and depending from the platform and movable up-and-down in guides 34. The platform is lifted by means of counterweights 35 (Fig. 7) connected by means of cords 36 and cross bars 36a to the rods 33. The platform is lowered by means of a foot pedal 37 on a lever 38 having a connection 39 with a rod 40 attached to the platform 11.

The operation of unloading a case of empty jars is as follows:

While the uncasing platform 11 is in its lifted position an inverted case C filled with empty jars is moved forward by the bar conveyor 10 thereby sliding the case of jars from the conveyor table 10$^a$ (Fig. 7) into position on the platform as shown in Fig. 4, where it is arrested by a stop bar 40$^a$ (Fig. 8) hinged at 40$^b$ to swing downward from a vertical to a horizontal position. The side flaps 27 are loosely held in their folded back position by side rails 41. The operator now depresses the foot pedal 37 and thereby lowers the platform to its lowermost position (Fig. 5) carrying with it the empty jars while the case C is held stationary by the extended end flaps 28 resting on the bar conveyor table 10$^a$. The uppermost tier of jars is now on the level with the table 13 and is slid into position on the table by the pusher 12. The operator next moves the platform 11 to its intermediate position by allowing an upward movement of the foot pedal by the counterweights 35. The lowermost tier of jars is then transferred to the station 14 by the pusher bar which at the same time advances the first group of jars to station 15. This leaves the platform empty and when the foot pedal is released, the platform is returned to its upper position ready for the next uncasing operation.

The casing mechanism shown in Figs. 1 to 3, for casing or loading the filled jars into the cases, is similar in some respects to the uncasing mechanism. It includes the casing platform 24 mounted for up-and-down movement as by means of a foot pedal and counterweights, the same as employed with the uncasing mechanism. The jars which have been filled and sealed are advanced by the three-lane conveyor 21 onto the casing table 22 which is of a size and shape to hold a group of 12 jars arranged in three rows containing 4 jars each. The jars as they are advanced by the conveyor 21 to the table 22 are held in rows by stationary guide rails 42 which provide individual lanes for said rows. As the jars move onto the casing table 22, the rows are held in spaced relation by wedge bars 43, thereby facilitating the placing of the partitions 31 between the rows of jars.

A vertically disposed cut-off plate 44 is slidable horizontally by means of a handle 45 into position to segregate the group of jars on the table 22 and cut off the flow from the conveyor 21 while said group is being transferred to the platform 24. The plate 44 is guided in its movements by stationary bars 46. When the group of jars has been moved onto the table 22, the partitions 31 and spacing pad 30 are placed in position thereon. The platform 24 is then lifted to its intermediate position and the pusher 47 is operated to transfer the jars to the platform. The platform 24 is now lowered with the tier of jars thereon to the Fig. 2 position, and a second group of jars is transferred from the casing table 22 into position over the first group or tier. The platform is now lifted and carries the jars into the inverted case C. The latter may then be advanced by the bar conveyor 10, thus clearing the way for a succeeding casing operation.

The apparatus is so constructed and arranged that all of the packaging operations including the uncasing of the jars, filling, vacuumizing, sealing, labeling, casing or packing of the filled jars in cases, and sealing the cases may be carried on concurrently or as a continuous operation. The operator may be conveniently located at the position 48 for effecting the required manual operations of both the uncasing and casing apparatus. The conveyors are preferably power driven by a motor or motors (not shown).

The cycle of the operations in which the operator uncases empty jars and concurrently cases the filled jars is as follows:

It is assumed that at the commencement of the cycle, a group of 12 jars has been assembled on the casing table 22 (Fig. 1), 12 jars at station 15 with partitions 31 around the jars, 12 jars at station 14 with partitions therearound and a pad 30 thereon, an inverted empty case C is in position over the uncasing platform 11 and the platform in its lower position (Fig. 5), an inverted empty case is over the casing platform 24 and the latter in its intermediate position with no jars thereon. The operator first removes the partitions 31 from the jars at station 15 and places them around the group of jars on the casing table 22, then removes the pad 30 from the jars at station 14 and places it over the jars on the table 22. Next, the pusher 23 is operated to push the group of filled jars from table 22 onto the casing platform 24. The pusher 12 is also operated to push the upper tier of jars (Fig. 5) onto the platform 13 at station 14. The casing platform 24 is then dropped from its middle position to its lowest position (Fig. 2). The uncasing platform 11 is then returned from its lowest position to its middle position (Fig. 6). A group of 12 filled jars is now moved from the three-lane conveyor 21 onto the casing table 22 and while the jars are thus moving into position the operator removes the partitions 31 from the empty jars at station 15 and places them around the filled jars on the casing table 22. A second tier of filled jars is now pushed from the casing table 22 to the platform 24 and the lower tier of empty jars is pushed from the uncasing platform 11 onto the table 13 at the station 14. The casing platform 24 is then raised from its lowest position to its upper position thereby inserting the two tiers of filled jars into the inverted empty case C. The uncasing platform 11 is also raised from its middle position to its upper position on a level with the bottoms of the inverted cases and the surface of the bar conveyor table 10$^a$ on which the cases are supported. The bar conveyor is now moved in the direction of the arrow to transfer the filled case from the platform 24 to the inverter 24$^a$. At the same time, the empty inverted case over the platform 11 is moved to a position over the casing platform 24 while another inverted case of empty jars is brought to position over the platform 11. The inverter 29 operates to turn the filled case to upright position and to deposit it on the conveyor 24$^b$ by which the case is carried to the gluing apparatus (not shown) for sealing the case. Another group of 12 filled jars now moves from the conveyor 21 onto the table 22. While this is taking place, the operator places partitions 31 around the jars and a pad 30 on top of the jars, said partitions and pad being transferred from stations 15 and 14 respectively. The casing platform 24 is now dropped from its upper position to its middle position and the uncasing platform 11 is moved down from its upper position to its lowest position, thus lowering its contents of 24 empty jars from the case at rest over the platform. This completes the casing and uncasing cycle.

It will be noted that the filled jars are right side up when placed in a case at the casing station so that when the case is inverted by the inverter 24$^a$ and sealed, the jars are bottom side up within the case. If desired, the sealed flaps may then be considered as forming the bottom of the case, so that the jars will be right side up when the case is again inverted and the top opened. The question of which is the top and which is the bottom of the case is ordinarily determined by the printing or decorations on the side walls of the case.

Modifications may be resorted to within the spirit and scope of my invention.

I claim:

1. Apparatus for use in packaging jars or like containers which are packed in cases, each case having a top comprising side and end flaps foldable back for opening the case, said apparatus comprising a horizontal platform mounted for up-and-down bodily movement vertically, means for holding the said case stationary in an inverted position over and in register with the platform during the upward movement of the platform, a horizontal table having a fixed mounting in a position at one side of the platform at a level below that of the inverted case and its support, means for moving the platform bodily up and down vertically to positions respectively above and below the level of the said table and for holding the platform substantially on a level with the table, means for transferring a tier of the containers from the table to the platform while the latter is in its said position on a level with the table and for thereafter transferring a second tier of the containers onto the first-mentioned tier while the platform is in its said position below the level of the table, the platform when lifted to its said position above the level of the table being in position to support the containers within the case while the latter is in said inverted position.

2. Apparatus for packing jars or like containers in cases, said apparatus comprising a horizontal platform mounted for bodily movement up and down vertically, means for mounting a case and holding its stationary in an inverted position over and in register with the platform during the upward movement of the platform, a horizontal table having a stationary mounting in a position at one side of the platform at a level below the inverted case and its support, means for moving the platform bodily up and down vertically to positions respectively above and below the level of said table, means for transferring a group of said containers from the table onto the platform while the latter is on a level with the table and thereafter moving a group of the containers from the platform onto the first-mentioned group while the platform is in said position below the level of the table, the platform with the said containers thereon when moved vertically upward being brought to a position in which the said containers are within the said case while the latter is supported in said inverted position.

3. The combination of a horizontal traveling conveyor, a casing table, means for holding the table in line with the conveyor in a fixed position to receive groups of jars or like containers from the conveyor, a container platform positioned at one side of and adjacent to said table, said platform being mounted for straight line bodily movement vertically to and from positions below, at, and above the level of said table, means for moving said platform vertically and holding it stationary at each of said positions, means comprising horizontally spaced supporting surfaces for supporting an open case in an inverted position with the lower, open end of the case spaced above and in register with the platform, means for shifting a group of containers from the table onto the platform while the latter is on a level therewith and thereby positioning one tier of containers on the platform and for thereafter shifting a second group of containers from the table onto said tier while the platform is in its lowered position, and means for thereafter moving the platform vertically upward with the two tiers of containers thereon to a position between said supporting surfaces while the case is maintained in said inverted position and thereby placing the two tiers of containers within the case.

4. Apparatus comprising horizontally spaced and horizontally disposed supporting surfaces for a case, the latter having a top comprising foldable side and end flaps, means for holding the case in inverted position on said supporting surfaces and for holding the flaps folded back, a platform mounted for vertical bodily movement directly beneath and in vertical register with the case while the latter is in said position, a table mounted in fixed position at one side of the platform and spaced below said supporting surfaces and the bottom level of the case when the latter is in said inverted position, means for holding the platform stationary in positions respectively below and on a level with said table, means for shifting groups of containers between the platform and table while the platform is held stationary in said positions respectively below and on a level with said table, and means for moving the platform upward to a position between said supporting surfaces and about on a level with the open end of the case while the latter is supported in said position on said supporting surfaces.

5. Casing apparatus comprising a horizontally disposed support for an inverted case, said support comprising horizontally spaced supporting surfaces, said case having a top comprising foldable flaps, a platform mounted for bodily movement up and down vertically, means for guiding the platform and holding it horizontal during said up-and-down movements, means for shifting the inverted case on its support to a position directly over and in vertical register with the platform with the end flaps extended outwardly from the case and resting on said supporting surfaces, a table having a stationary mounting at one side of and adjacent to the platform, means for positioning a group of containers on said table, means for moving the platform up and down and holding it at rest in positions above, below, and on a level with the table, a pusher slidably mounted between the levels of the table and said supporting surfaces in position to push a group of containers off the table onto the platform while the platform is on a level with the table, said platform, when in its lowered position, being below the level of the table for supporting the group of containers with their upper ends about on a level with the table and thereby permitting a second group of containers to be shifted by the pusher into a position over the first group so that the containers are mounted in tiers on the platform, and means for moving the platform upward from its lowered position, with the two tiers of containers thereon, to a position in which the platform is between said supporting surfaces and about on a level with the open end of the case, and means for holding the case in said position of register with the platform during said upward movement of the platform and thereby bringing the containers into the case.

GARLAND LUFKIN.

REFERENCES CITED

The following references are of record in the file of this patent:

UNITED STATES PATENTS

| Number | Name | Date |
|---|---|---|
| 797,752 | Roth | Aug. 22, 1905 |
| 814,454 | Keyes | Mar. 6, 1906 |
| 1,247,722 | Rogers et al. | Nov. 27, 1917 |
| 1,336,838 | Heeter | Apr. 13, 1920 |
| 1,348,341 | Winkley | Aug. 3, 1920 |
| 1,673,014 | Morrison | June 12, 1928 |
| 1,904,720 | Douglass | Apr. 18, 1933 |
| 2,119,725 | Stecher | June 7, 1938 |
| 2,323,852 | Seidel et al. | July 6, 1943 |
| 2,470,795 | Socke | May 24, 1949 |